United States Patent [19]

Smyczek et al.

[11] Patent Number: 5,444,466
[45] Date of Patent: Aug. 22, 1995

[54] WIRE MARKING SYSTEM AND METHOD

[75] Inventors: Paul J. Smyczek; Youssef Azmani, both of Hales Corners; Jerry R. Harrison, Oak Creek, all of Wis.

[73] Assignee: Electronic Cable Specialists, Inc., Franklin, Wis.

[21] Appl. No.: 823,069

[22] Filed: Jan. 14, 1992

Related U.S. Application Data

[63] Continuation-in-part of Ser. No. 667,475, Mar. 11, 1991, abandoned.

[51] Int. Cl.6 .............................................. B41F 17/00
[52] U.S. Cl. ......................................... 347/4; 101/35; 118/620; 174/112; 347/106; 427/536
[58] Field of Search ..................... 347/2, 4, 106, 101; 118/620, 72; 174/112; 427/536, 533, 535, 322; 250/492.3

[56] References Cited

U.S. PATENT DOCUMENTS

| | | | |
|---|---|---|---|
| 4,029,006 | 6/1977 | Mercer | 347/4 X |
| 4,503,437 | 3/1985 | Katzschner | 346/1.1 |
| 4,748,043 | 5/1988 | Seaver et al. | 346/140 R X |
| 5,223,852 | 6/1993 | Oresti et al. | 347/4 |
| 5,237,917 | 8/1993 | Traut et al. | 101/35 |

Primary Examiner—A. T. Grimley
Assistant Examiner—Nestor R. Ramirez
Attorney, Agent, or Firm—Ryan, Kees & Hohenfeldt

[57] ABSTRACT

The problem of getting inked printing applied to and permanently adhered to a fluorocarbon insulation material on wires or the surface of a fluorocarbon sheath covering a plurality of twisted insulated wires where the sheath also becomes twisted and contoured is overcome by treating the fluorocarbon surface with an electrical corona to etch it and alter its surface characteristics and then printing the desired information on the sheath with an ink jet printer which can reach into the depressions in the sheath which result from the sheath being twisted.

23 Claims, 3 Drawing Sheets

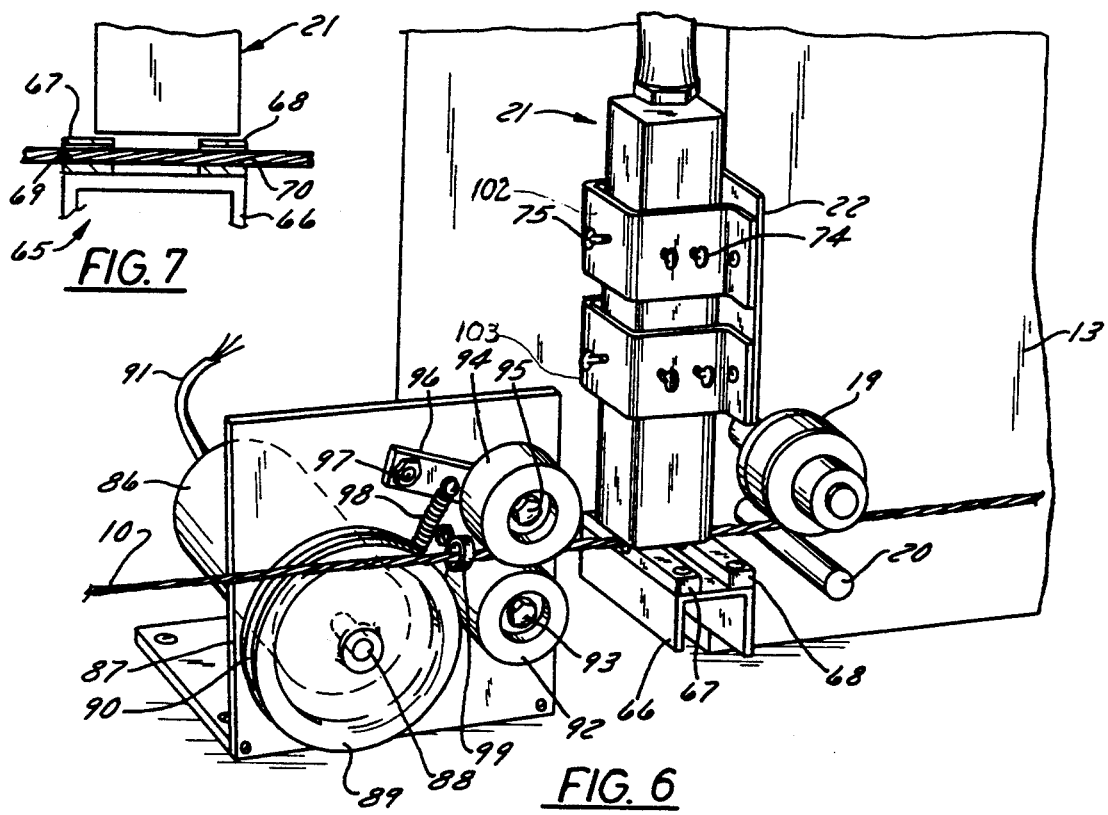
FIG. 7
FIG. 6
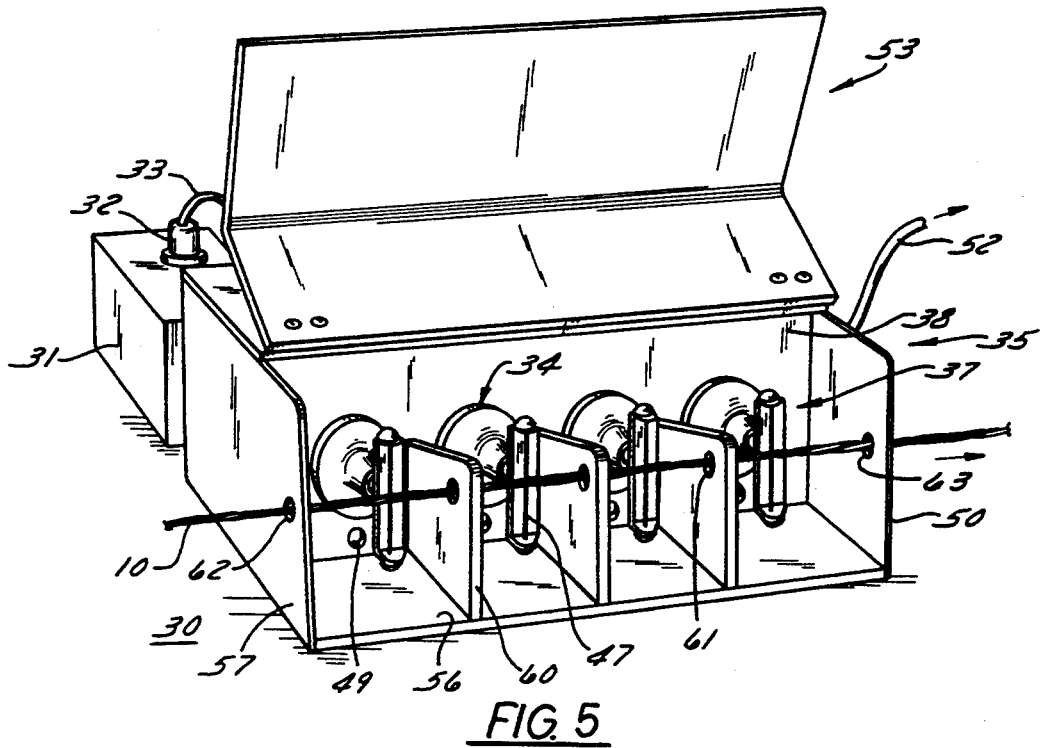
FIG. 5

WIRE MARKING SYSTEM AND METHOD

This is a continuation-in-part of application Ser. No. 07/667,475, filed on Mar. 11, 1991, now abandoned.

BACKGROUND OF THE INVENTION

The invention disclosed herein pertains to a method and system for marking or applying information to insulated electrical conductors and other objects which are comprised of ink phobic materials such as fluorocarbon resins.

There are many occasions where it is necessary to mark insulated electrical conductors with information such as the wire size or the identity of the circuit in which the wire is involved. The insulation on wires and cables used in airplanes and space vehicles must be of the highest quality and must be marked to facilitate tracing and interconnecting.

The insulating materials which meet the requirements of airplanes, space vehicles and other critical applications to the highest degree are the fluorocarbons, sometimes called fluoroplastics. Polytetrafluoroethylene (PTFE), tetrafluoroethylene (TFE), fluorinated ethylenepropylene (FEP), perfluoroaloxy (PFA) and ethylene tetrafluoroethylene (ETFE), also known by the Du Pont Company trademark "TEFZEL" are typical of fluorocarbons or fluoroplastics which meet the indicated requirements. For the sake of brevity, fluorocarbon will be used herein as a generic word for PTFE and FEP of all grades which have the ink phobic properties of present concern. Fluorocarbons are characterized by low coefficients of friction, insolubility, extremely low adhesiveness, good temperature stability, good mechanical and electrical properties and non-flammability. Printing indicia or information on fluorocarbon wire insulation or other fluorocarbon objects having uneven surfaces has not been successful using conventional printing methods because the ink or dye by which the information is printed does not adhere to the fluorocarbon and is easily rubbed off. The avionics industry and military specifications require that identification information be applied on wire when it is specified and that the printing be durable and not removable by mechanical deformation or abrasion. As far as is known, no one has succeeded in applying durable printed information directly to fluorocarbon wire insulation or to fluorocarbon insulating cable sheathing which has an uneven surface such as is the case with sheathed cable comprised of twisted wires. Consequently, wire vendors have resorted to wrapping sleeves, made of ink compatible material, about fluorocarbon insulated wires and cables after printing whatever information is required on the sleeves. Surface tape labeling and tags are also used. Applying sleeves, tags or tape bearing printed information on fluorocarbon wires and cables raises the cost of the cable to the customer. These marking expedients, which are adapted because of the poor results obtained when printing on fluorocarbon surfaces before the present invention was made, increase the bulk and weight of wires and cables. Since there are miles of cables and wires on many aircraft and space vehicles and since the identifying media are applied frequently along the entire length of every wire or cable, the cumulative weight of the currently used marking media can become significant. The additional fuel consumed by an aircraft simply due to the weight added by discrete prior art cable and wire identifying media has significant value. Knowledgeable persons assert that it costs an airplane having an average duty cycle $800.00 to fly one pound of material over a period of one year.

Various schemes for treating cured fluorocarbon surfaces in a manner that would make them more susceptible to durable printing have been tried but none have been successful although durable printing has been achieved on fluorocarbon wire insulation surfaces immediately after extrusion or by use of a hot stamping method on round and regular surfaces.

SUMMARY OF THE INVENTION

The main objective of the invention disclosed herein is to provide a system and method for printing directly on fluorocarbon surfaces, especially irregular surfaces with the resulting printing being tightly bonded to the fluorocarbon, and being clearly legible even in depressions and prominences.

Briefly stated, a feature of the invention is to expose the fluorocarbon resin surface on which printing is contemplated to an electrical corona field for etching and conditioning the surface to accept ink followed by printing directly on the fluorocarbon surface. In particular, where printing must be carried out on the sheath of a small cable which is twisted and has a spiral contour as a result of it being formed tightly around a plurality of twisted insulated wires, an ink jet printer is used for printing since the jets which form indicia such as letters are directed essentially radially inwardly toward the insulating wire or sheath surface so they reach the prominences and the depressions in the contoured surface of the cable sheath equally well. Experience with the new method has demonstrated that the printed information is sharp and clearly legible and fulfills the requirements of fluorocarbon insulated wire and cable users.

In this specification the word "conductor" is used in a generic sense to specify a single fluorocarbon insulated wire or bundle of wires and a plurality of wires which may or may not be twisted but may be called a cable because of being surrounded by a fluorocarbon material sheath.

Another important advantage of passing the fluorocarbon insulated wire through an electrical corona field is that particles such as dust are caused to shed from the insulation before printing begins.

How the foregoing and other more specific objectives of the invention are achieved will be evident in the ensuing description of a preferred embodiment of the method and system which will now be set forth in reference to the drawings.

DESCRIPTION OF THE DRAWINGS

FIG. 5 is a perspective view of a housing in which there are a plurality of corona emitting electrodes next to which a cable having a deformed or irregular fluorocarbon surface passes to condition the surface for accepting printed information;

FIG. 6 is a perspective view of an encoder drive unit and an ink jet printer magnified and isolated from the system shown in FIG. 1; and FIG. 7 shows a wire guide which is used in conjunction with the printing head illustrated in FIG. 6.

DESCRIPTION OF A PREFERRED EMBODIMENT

Figure 1:
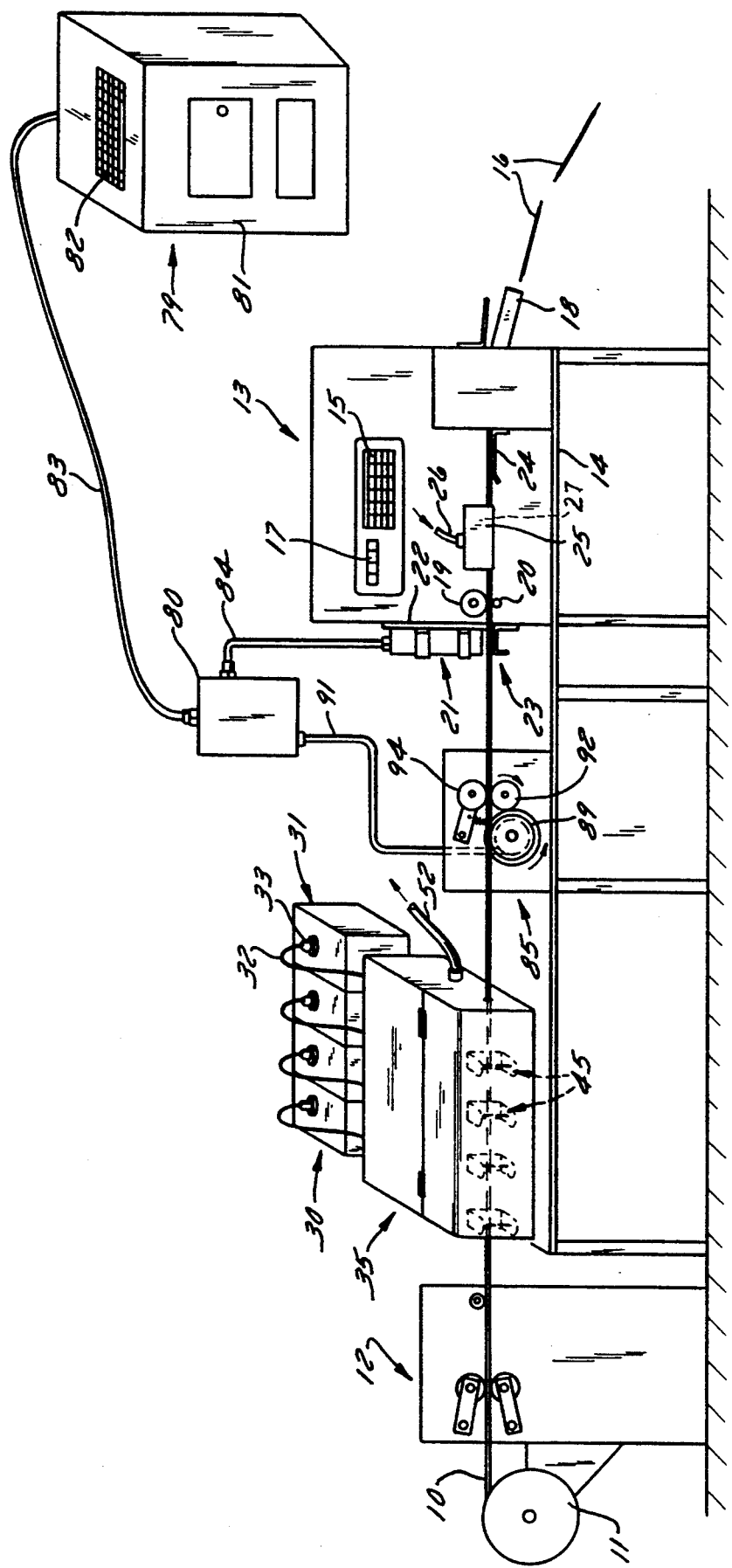
FIG. 1 is a diagrammatic view of the components of the system for carrying out the new method of printing on regular and irregular fluorocarbon surfaces.
Figure 3:
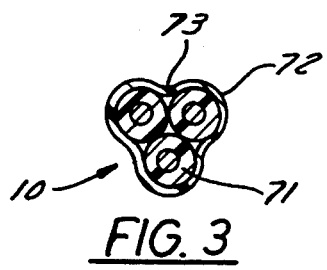
FIG. 3 is a transverse section taken through the illustrative cable depicted in FIG. 2.
Figure 2:
FIG. 2 depicts a sample of a multiconductor cable having a fluorocarbon sheath which is irregular because of the conductors in the sheath being twisted, the first letters of the alphabet on the sheath exemplifying printing on an irregular fluorocarbon surface in accordance with the new method and printing system.

The new method of printing on irregular fluorocarbon surfaces is conducted by means of the apparatus depicted in FIG. 1. In this example, the item which has an irregular fluorocarbon surface and is to be conditioned, in accordance with the invention, by exposing it to an electric corona field before printing on it, is a fluorocarbon sheathed cable which is generally designated by the reference numeral 10. The insulated conductors in the sheath are twisted so the surface of the fluorocarbon sheath simulates the twisting and exhibits a lack of smoothness as illustrated in FIGS. 2 and 3. In this example, the cable is being withdrawn from a reel 11 which is mounted to a wire prefeeder that is generally designated by the numeral 12. The prefeeder can be anyone of several commercially available types which are capable of withdrawing cable from reel 11 at a rate which provides for tension in the cable being held substantially constant. A commercially available wire processing unit, generally designated by the numeral 13, stands on a table top 14 at the right side of the drawing. The wire processing unit 13 may perform multiple functions such as cutting the cable, or individual wires if that is what is being processed, into segments of uniform length and stripping the insulation from the ends of the wire or wires in the segments. By way of example and not limitation, the wire processor being used successfully in an actual embodiment is identified by the trademark "Eubanks 4600" of Eubanks Engineering, Monrovia, Calif. Suitable wire processors are also available from other manufacturers.

Processor 13 has a push button array 15 which allows the user to select such parameters as the length of the segments 16 which are to be cut from cable 10, the number of segments in a batch. There are other push buttons for clearing or resetting the length and batch quantities and so forth. A 4-digit seven segment display 17 provides a count of the number of segments which have been processed in a given run of the processor. Wire segments 16 are discharged from processor 13 by way of a spout 18. In practice, there is a container, not shown, for collecting the wire segments after they are printed and cut to length. Wire processor 13 has a driven roller 19 whose periphery bears on a spindle 20 and moves the cable 10 to be drawn from reel 11 at a predetermined linear speed which can be set in the processor. Printing on the wire, in accordance with the invention, is accomplished with a commercially available ink jet printing head which is generally designated by the numeral 21. In this illustrative embodiment, the ink jet printing head 21 is mounted on a base plate 22 which, by way of example and not limitation, is mounted to wire processor 13. Before passing between draw rolls 19 and 20, the fluorocarbon cable sheath surface, face, particularly its bottom side, runs over and on a cable support and guide device 65 which is shown in detail in FIG. 7 and will be discussed later. There is also a cable support surface 24 at the input for the cable in wire processor 13. Support surfaces 23 and 24 are used desirably for minimizing flutter in the cable. An open ended chamber 25 is mounted on the front or infeed side of the wire processor to provide for exposing the cable to warm, dry air to enhance drying of the printing ink on the cable before it is enters the wire process 13. The source of warm air is not shown, but it will be understood that it is admitted to drying chamber 25 through a connector 26 to which a hose, not shown, would be connected for obtaining warm air from a source. It is preferable for the bottom side of the cable to bear on the bottom surface 27 of the drying chamber 25 to avoid any possibility of the ink being smeared while drying and to assist in eliminating flutter of the cable. Even without a drying device it takes some effort to cause any smearing of the print immediately after printing which is the great advantage of treating the fluorocarbon surface with corona.

The cable drying chamber 25 may be substantially under 25 inches in length. It is interesting to contrast this with practice in systems preceding the present invention wherein printing on conductors is accomplished with typeset rollers which use paint of different colors to identify different conductors. In these conventional systems, a substantial amount of solvents has to be evaporated from the paint to set the print sufficiently for the print to be touched or for the cable to be wound on a reel without substantial smearing of the print. In such conventional arrangements towers typically about 20 feet long are used to dry the printed cables sufficiently for the printing to resist smearing.

It is recognized that ink jet printers are used to print on cables which have various kinds of insulating sheaths while the cables are still hot and uncured immediately after having been extruded in the manufacturing process, but insofar as is known, no one has been able to print satisfactorily on fluorocarbon surfaces when the fluorocarbon is cold and cured already as is possible with the new corona treating method and system.

Figure 4:
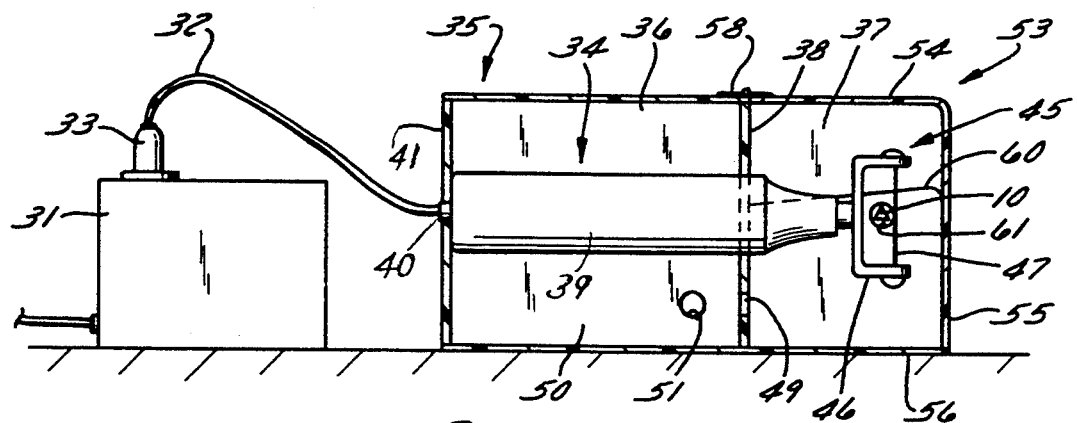
FIG. 4 is a side elevational view of a high frequency electrical generator connected to a corona generator.

The corona treatment assembly is designated generally by the numeral 30 in FIG. 1 and is shown in further detail in FIGS. 4 and 5. The treatment assembly comprises a plurality of high frequency generators 31. In the illustrative embodiment, by way of example and not limitation, four high frequency and high voltage generators 31 are employed. Fewer or even one high voltage generator 34 having an output voltage greater than any one or the sum of the four generators can be used. There is a high voltage lead wire 32 extending out of typical generator 31 from an insulating bushing 33. One of the generators 31 and one of the corona applicators 34 is depicted in FIG. 4 to which attention is now invited. The four applicators 34 are mounted in a housing 35 which is divided into two chambers 36 and 37 by a wall 38. As indicated above, a single high capacity corona generator 34 could replace the four generators. A preferred corona producing system is one that applies a high voltage at a high frequency relative to power mains voltage. A commercial embodiment of the new fluorocarbon corona treater and ink jet printer system uses a single corona treater which has an output voltage which is adjustable to at least 250,000 volts at a frequency in the Megahertz range. Such a system is obtainable from Electro-Technic Products, Inc. under the model designation BD-80. Its voltage is adjustable from 50,000 to 250,000 volts at a frequency of 2 MHz. Best results have been obtained in treating and conditioning fluorocarbon insulation surfaces for ink jet printing when the corona generator is adjusted to produce an output voltage of 250,000 volts. The insulated body 39 of the corona applicator 34 is supported at one end in a hole 40 in the rear wall 41 of the housing. Housing 35 is constructed of an electrical insulating material such as acrylic materials known by the trademarks Lucite or Plexiglas.

FIG. 4 exhibits an electrode 45 from which corona radiates. The electrode is comprised of a metal bracket 46 which has a fine wire 47 stretched across its legs. When a high electrical potential of at least 15 to 25 kilovolts and preferably as high or even higher than 250,000 volts is applied to fine electrode wire 47, a high electric field intensity is developed about the wire and this causes ionizing of the air surrounding the wire which is manifested by a bright blue electric discharge. A high frequency potential of 15 kilovolts will cause corona to start radiating from a fine wire but higher potential results in a higher corona yield and an accompanying better conditioning and activating of the fluorocarbon surface to accept and hold ink better. The cable 10 which has a fluorocarbon sheath identified by the numeral 48 in FIG. 2 passes through the free space between the fine electrode wire 47 and the bracket 46 for the cable to be exposed to the corona emanating from the wire.

As shown in FIGS. 4 and 5, the transverse partition wall 38 has four holes, such as the one marked 49, in it. These holes interconnect chambers 37 and 36 and are provided for facilitating removal of the dust which becomes suspended in the air within chamber 37 as a result of the corona causing the dust or other particulate matter to be shed from the fluorocarbon surface 48 of the cable. One side wall 50 of plastic housing 35 has an aperture 51 to which a vacuum hose 52, shown in FIG. 1, is coupled to provide for drawing the dust entraining air and also ozone produced by the corona from the chambers 36 and 37 of the housing. As exhibited in FIG. 4 taken in conjunction with FIG. 5, the corona irradiating chamber 37 is defined by a cover 53 having a flat top 54 and a vertically depending front wall 55. The cover is shown in FIG. 4 in closed position as it would be when corona radiation of a fluorocarbon surface is underway. When the cover 53 is closed it defines a closed chamber in conjunction with bottom plate 56 and side walls 50 and 57 of the housing. As shown in FIG. 5, the cover 53 is swingable to open position on hinges such as the one marked 58. In FIG. 5 one may see that there are upstanding laterally spaced apart plates 60 which subdivide the corona treating chamber 37 and are provided with aligned holes such as the one marked 61 through which the fluorocarbon surfaced cable is threaded. Holes 61 provide for guiding the cable and contribute to limiting the amplitude of any flutter which the cable may have so that the cable surface will remain spaced from the fine corona radiating electrode wires 47. Note that there is a dust and ozone exhaust hole 49 in wall 38 facing each one of the compartments which are subdivided by the partition walls 60. There are also holes 62 and 63 in sidewalls 35 of the housing which guide the cable and also serve as inlets for fresh air to make up for air which is subject to exhaust for getting rid of ozone and dust. Of course, in the fluorocarbon treater model of the invention wherein only a single high voltage and high frequency corona generator is used, there is only one corona treatment chamber. The chamber is defined by bottom 56, cover 53, rear wall 38 and end walls 50 and 57. Partition walls 60 are omitted.

The top, bottom, side walls and cover comprising the housing 35 are composed of a plastic material such as previously mentioned acrylic materials identified by the trademarks "Lucite" or "Plexiglas", respectively or other material which has substantial electrical insulating qualities. In an actual embodiment of the corona treating system, the housing is made of what might be called a smoked or darkened plastic material which filters out the bright light resulting from the corona but the plastic is not so dark that the electrodes cannot be visualized within the chamber 37 as the cable being treated with corona passes through it. Besides the tinted plastic comprising the housing shielding an observer's eyes from the bright corona and protecting against electric shock, the housing, particularly when door 53 is closed, suppresses the noise which accompanies emission of electrical corona.

The ink jet printer 21 was alluded to earlier in reference to FIG. 1 and will now be examined in greater detail in reference to FIG. 6. In FIG. 6 one may see that the ink jet printing head 21 is clamped onto plate 22 which is fastened to wire processor 13 although the head could be supported by other means. The wire or cable 10 must be as stable as possible when it passes under the ink jet printing head 21. Because the multiple conductors in the illustrative cable 10 are twisted, the fluorocarbon sheath on the cable has depressions and prominences induced in it which tend to bring about some vibration of the cable as a result of it being nipped between rollers 19 and 20 which draw the cable. To stabilize the cable while it is being subjected to ink jet printing, the previously mentioned guide assembly which is generally designated by the numeral 65 is provided. It is shown in FIG. 6 to comprise a channel-shaped base 66 on which are supported guide members 67 and 68 and is shown in section in FIG. 7 to which attention is invited. In FIG. 7 inlet guide 67 has an aperture 69 which has an inside diameter just slightly greater than the outside diameter or largest cross-sectional dimension of wire or cable 10 expected to be printed with the apparatus so the cable passes through the inlet guide aperture 69 with all clearance. This tends to inhibit vibration or fluttering of the cable which is induced mainly by the cable being nipped by cable draw rollers 19 and 20. Exit guide 68 has an aperture 70 which is large enough so that the cable passes through it with sufficient clearance to avoid smearing the ink of the printed information which the ink jet printer head 21 prints on the cable. Note, however, that the cable slides on the bottom of aperture 70 which it can do in the interest of stabilizing the cable without danger of smearing any ink because there is no printing on the bottom side of the cable.

The segment of a cable depicted in FIG. 2 is illustrative of the problem of printing on an irregular surface due to twisting of the insulated conductors 71 which are encased in the fluorocarbon sheath of cable 10. As exhibited in FIGS. 2 and 3, twisting of the conductors causes the cable sheath 48 to develop helical ridges or prominences 72 contiguous with helical depressions 73. It is evident that conventional printing using hard type wherein the characters are pressed against an ink coated ribbon, for example, which acts like a typewriter ribbon to transfer them to the sheath 48, only works when the cable is regular and untwisted since the ridges on a twisted cable prevent the printing from reaching into the depressions that occur in twisted cable. Using an ink jet printer 21, in accordance with the invention, overcomes the problems of printing on irregular surfaces and the novel exposure of fluorocarbon surfaces to electric corona overcomes the problem of insecure adhesion of the ink to the fluorocarbon.

Of course, the concept of exposing fluorocarbon insulated conductors to electric corona and printing with an ink jet on the insulation is not limited to multiple conductor cables. The system has demonstrated a capability for printing on a single insulated wire as small as number 22 gauge which, in a case where the outside diameter of the fluorocarbon insulation is only 0.041 inch the printed information was easily legible by observers who have normal eyesight when their eyes are as much as one foot away. In the case of twisted conductors, the ink jets are able to print on adjacent prominences and depressions very sharply and without any spreading which would produce an effect similar to defocussing.

As shown in FIG. 6, printing head 21 is clamped to the base plate 22 by means of a pair of generally u-shaped clamps 102 and 103. The clamps provide for positioning the ink jet printing head 21 in alignment with the moving cable 10 so the printing does not run askew of the cable. On three sides of typical clamp 102 there are some thumb screws, such as those marked 74 and 75 screwed into the sides of the clamps. It will be evident that by turning the thumb screws in and out in an appropriate manner the ink jet head 21 can be shifted slightly left and right and in and out to align the ink jets in the printing head with cable 10.

The ink jet printing system includes two units 79 and 80 which are characterized as control units and are depicted in FIG. 1. Control unit 79 includes a cabinet 81 which provides space for the control circuitry and mechanisms and for storing material such as ink and diluting and cleaning solvents. The controller is a commercially available type. It has a keyboard 82 on its top which allows the user to key in the information which the user desires to have printed on the cable or wire by means of the ink jet printer. Various other operating parameters can be programmed into the controller by means of keyboard 82. The controller is based on a microprocessor and the usual peripherals which are not shown. By way of example and not limitation, in one commercial embodiment of the controller a memory is provided which provides storage for about 250 characters. The maximum printing speed of the printer is about 1200 characters per second on an elongated object such as wire or cable being fed at about 3 feet per second. Despite the high rate at which the cable moves and the printer prints, the print drys very rapidly and on most cables does not present a smearing problem even if dryer 25 is omitted although it is advisable not to subject the segments 16 being discharged from the wire process 13 for a few moments after the segments are discharged from the processor if the dryer 25 is not used.

In setting up the system for printing, after what is desired to be printed has been programmed in by use of keyboard 82 and the corona treater is turned on, it is only necessary to grasp the leading end of the cable after it has been passed through the nip or draw rolls 19 and 20 and pull the cable manually at high speed, such as at 3 feet per second to determine and observe on the sample length of cable if what was intended to be printed on the cable is present and is in the desired format. After the printing is approved, the cable can be threaded through the dryer 25 and into the processor 13 in readiness for being continuously treated with electric corona and printed.

Referring further to FIG. 1, there is a flexible tube 83 running from main controller 82 to control unit 80. Another flexible tube 84 runs in between the ink jet printer 21 and control unit 80. The contents of tubes 83 and 84 are not visible but it will be understood that they contain smaller tubes for feeding ink from controller 79 to ink jet printer 21 and recirculating the ink back to controller 79 for the purpose of allowing the ink which is returned to controller 79 to have solvent added to it to keep the density of the ink optimized. The solvent by itself may also be recirculated to periodically clean and refresh the ink jet printer 21. There are a plurality of electric conductors in tubes 83 and 84 which exercise various control operations over the ink jet printer 21 and, of course, transmit the data from the controller 79 to the printer so that the ink jets in the printer are governed to print the data on the cable or wire in the proper format.

FIG. 1 shows an encoder drive unit 85 between the corona treatment assembly 30 and the ink jet printer 21. The encoder drive unit is shown in more detail in FIG. 6 to which attention is now invited. The drive unit includes a commercially available shaft angle encoder 86 which is mounted to a support 87. The encoder shaft 88 has a friction drivable wheel 89 mounted to it. The wheel 89 has an annular groove in which a rubber ring 90 is installed. The encoder 86 produces analog electric signals indicative of the rotational angle of shaft 88 and the instantaneous speed at which the cable is being drawn. These signals are delivered to the control unit 80 by way of cable 91. The control unit 80 processes the signals and uses them to adjust the printing speed of the printer to correlate with the speed of the cable. FIG. 6 shows that the encoder drive unit includes a driver roller 92 which is rotatable about a shaft 93. An upper idler roller 94 turns on a shaft 95 which is fixed on a swingable arm 96. Arm 96 swings about an axis 97 under the influence of a spring 98 which causes upper roller 94 to press cable 10 against driver roller 90 so that as a result of the cable being pulled to the right in FIG. 6, roller 92 will be driven rotationally. The periphery of lower roller 92 is in frictional engagement with the rubber ring 90 in the periphery of the wheel 89 on the shaft 88 of the encoder so that the wheel turns and causes shaft encoder 86 to produce the signals which are indicative of the speed of the cable toward the ink jet printer 21. The encoder drive unit will allow printing to start and stop when the wire starts and stops moving, respectively, and it also effects printing at a speed correlated with the speed at which the cable is moving. As indicated earlier, this allows for convenient adjustment of the printer and a quality check when setting up the apparatus in preparation for making a production run. It is desirable for rollers 92 and 93, especially 92, to have a periphery made of a medium resilient material to enhance friction with the cable and also to suppress cable jitter.

As shown in FIG. 6, cable 10 is fed through a guide element, adjacent rollers 92 and 94, in the form of an eye 99 whose opening is large enough to accommodate the largest cable which is to be handled by the apparatus. The bottom of the opening in the ring 99 is at about the same level as the periphery of encoder drive roller 92 and at about the same level as the bottom of the apertures 69 and 70 of the cable guides which are located under the printer 21 and are depicted in FIG. 7. The mounting holes, not shown, for the encoder 86 are preferably slotted by a small amount to facilitate pressure adjustment between the lower encoder drive roller 92 and the encoder wheel 89.

Although a preferred embodiment of the invention has been depicted and described in detail, such depiction and description are intended to be illustrative of the concepts of the invention, rather than limiting, for the invention can be variously implemented and is to be limited only by interpretation of the claims which follow.

We claim:

1. Apparatus for printing on the surface of a fluorocarbon insulating material surrounding at least one elongated electrical conductor, comprising:
   a drawing device for drawing said conductor from a source under tension along a predetermined path, said device being spaced from said source,
   at least one electrode arranged along said path between said source and drawing device and means for applying an electrical potential of at least 25,000 volts to said electrode for electrical corona to be radiated from said electrode through which corona said conductor passes for exposing the surface of the fluorocarbon to corona, and
   an ink jet printer arranged along said path in a position for printing on said surface of said fluorocarbon insulating material after said conductor is exposed to the corona.

2. The apparatus according to claim 1 including a plurality of corona emitting electrodes arranged in succession along said path of the conductor.

3. The apparatus according to claim 2 including partition members disposed between said electrodes, each of said members having an aperture aligned with said predetermined path for the conductor and with said apertures in said side walls for said apertures to guide said conductor through said one compartment.

4. The apparatus according to claim 1 including:
   a housing constructed of insulating material, at least said one electrode or a plurality of said one electrodes being arranged in said housing and said path of the conductor passing through said housing.

5. The apparatus according to claim 1 including:
   a housing comprised of a box-like structure having a bottom, a top, a rear wall, a front wall and laterally spaced apart side walls,
   at least one partition member in said housing for dividing the interior of the housing into at least two compartments, that extend laterally of said housing,
   a plurality of said electrodes arranged in the respective compartments between said side walls and each of said side walls and partition member having a hole coincident with said predetermined path for said conductor to pass through the compartments and side walls.

6. The apparatus according to claim 5 including a door on said housing operable to facilitate access to the interior of the housing for threading said conductor through the housing.

7. The apparatus according to claim 5 wherein:
   at least the side walls, front wall, bottom and top of said housing are composed of a plastic material which is tinted for filtering out a substantial part of the light that is incidental to the presence of corona before said light can reach the eyes of a viewer of the housing.

8. The apparatus according to any one of claims 4, 5, or 7 including means for coupling a vacuum generating source to the interior of said housing for drawing out ozone produced by said corona and air containing particulate matter which is shed from said conductor as a result of its exposure to corona.

9. The apparatus according to claim 1 including an encoder arranged along said path of the conductor after said conductor is exposed to corona and upstream from said printer, and
   means for engaging the conductor while it is drawn in driving relation with said encoder for causing said encoder to produce electric signals representative of the speed at which said conductor is moving,
   control means responsive to said signals by controlling said printer to print at a rate correlated with the speed at which said conductor is moving.

10. The apparatus according any one of claims 5, 3, 7 or 9 wherein the electrical potential applied to said electrode is between 50,000 and 150,000 volts and the frequency of said electrical potential is about 2 MHz.

11. The apparatus according to claim 1 wherein the fluorocarbon is selected from the group consisting of polytetrafluoroethylene, fluorinated ethylene propylene, tetrafluoroethylene, perfluoroaloxy, and ethylene tetrafluoroethylene.

12. The apparatus according to claim 1 wherein said electrical potential applied to said electrode is between 50,000 and 150,000 volts.

13. The apparatus according to claim 1 wherein the electrical potential applied to said electrode is about 150,000 volts.

14. The apparatus according to claim 1 wherein said electrical potential has a frequency of about 2 MHz.

15. A method of printing with an ink jet printer on the surface of insulation covering individual conductors and on the surface of an insulation sheath covering a plurality of insulated twisted individual conductors where the insulation of the individual insulated conductors and of the sheath is a fluorocarbon material, the sheath presenting an irregular surface having contiguous prominences and depressions due to the wires being twisted, comprising the steps of:
   drawing at least one of said fluorocarbon insulated individual conductors or conductors containing a fluorocarbon sheath through a housing wherein the fluorocarbon surface is exposed to corona produced with an electrode to which a voltage of at least 25,000 volts is applied,
   printing on said fluorocarbon surface with an ink jet printer after the surface has been exposed to the corona.

16. The method according to claim 15 wherein said fluorocarbon is selected from the group consisting of polytetrafluoroethylene, fluorinated ethylene propylene, tetrafluoroethylene, perfluoroaloxy, and ethylene tetrafluoroethylene.

17. The method according to any one of claims 15 and 16 including:
   having a vacuum source drawing from said housing air containing ozone resulting from said corona and drawing particulate matter such as dust shed from said fluorocarbon surface due to exposure to the corona.

18. The method according to claim 17 wherein said voltage applied to said electrodes has a frequency of about 2 MHz.

19. The apparatus according to claim 18 wherein said electrical potential has a frequency of about 2 MHz.

20. The method according to any one of claims 15 or 16 wherein the voltage applied to said electrode is between 50,000 volts and 250,000 volts.

21. The method according to any one of claims 15 or 16 wherein said voltage applied to said electrode is about 250,000 volts.

22. The method according to any one of claims 15 or 16 wherein said voltage applied to said electrode has a frequency of about 2 MHz.

23. The method according to claim 16 wherein said voltage applied to said electrode has a frequency of about 2 MHz.

* * * * *